US004001587B2

United States Statutory Invention Registration [19]

[11] Reg. Number: H1587

[45] Published: Sep. 3, 1996

Van Valkenburgh et al.

[54] TRAILER FOR TRANSPORTING A SAFETY STRUCTURE WHICH IS USED FOR THE CONTAINMENT AND HANDLING OF HAZARDOUS MATERIALS

[75] Inventors: Norman S. Van Valkenburgh, Oxnard; Gary L. Van Valkenburgh, Ventura, both of Calif.

[73] Assignee: The United States of America as represented by the Secretary of the Navy, Washington, D.C.

[21] Appl. No.: 407,533

[22] Filed: Mar. 20, 1995

[51] Int. Cl.[6] ..... B60P 3/00

[52] U.S. Cl. ..... 280/789

[58] Field of Search ..... 280/781, 785, 280/786, 789, 791, 796, 797, 798, 799, DIG. 8, 840, 6.12; 296/182, 204; 410/82

[56] References Cited

U.S. PATENT DOCUMENTS

| | | | |
|---|---|---|---|
| 2,812,192 | 11/1957 | Cole | 280/789 |
| 3,098,656 | 7/1963 | Gregory | 280/797 |
| 3,404,444 | 10/1968 | Isbrandtsen | 410/82 |
| 3,520,551 | 7/1970 | Sellers | 280/781 |
| 3,697,098 | 10/1972 | Fisher | 280/DIG. 8 |
| 4,026,596 | 5/1977 | Carr | 410/82 |
| 5,256,024 | 10/1993 | Ross | 280/789 |
| 5,312,119 | 5/1994 | Schneider et al. | 280/6.12 |
| 5,443,131 | 8/1995 | Barlett | 280/789 |
| 5,454,597 | 10/1995 | Thomas et al. | 280/789 |
| 5,468,008 | 11/1995 | Hecht | 280/789 |

FOREIGN PATENT DOCUMENTS

| | | | |
|---|---|---|---|
| 1759658 | 9/1992 | U.S.S.R. | 280/789 |
| 1575373 | 9/1980 | United Kingdom | 280/789 |

*Primary Examiner*—Stephen C. Bentley
*Attorney, Agent, or Firm*—Melvin J. Sliwka; David S. Kalmbaugh

[57] ABSTRACT

A trailer for transporting an environmentally safe modular storage unit containing hazardous materials over the highways at speeds approaching about fifty five miles per hour. The trailer has a rectangular shaped frame and a hitch assembly extending longitudinally forward from front end of the rectangular shaped frame. The hitch assembly is coupled to a tow truck or other suitable vehicle to allow the trailer and the modular storage unit to be towed from a hazardous material site to a collection or storage site. The trailer is a tandem axle trailer equipped with electrical brakes and a lighting system. The underframe of the trailer includes a tandem axle wheel system which has four wheels and an oil lubricated hub and drums. A pair of leveling stanchions and a jack are provided to level, stabilize and balance the trailer and modular storage unit on driveways, inclined pavements, floors and other surfaces The rectangular shaped frame of the trailer also has positioned at each of its corners a fastmount with the fastmounts of the trailer being adapted to secure the modular storage unit to the trailer while the trailer is being towed over the highway or when the modular storage unit is being utilized at a collection or storage site.

18 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRAILER FOR TRANSPORTING A SAFETY STRUCTURE WHICH IS USED FOR THE CONTAINMENT AND HANDLING OF HAZARDOUS MATERIALS

BACKGROUND OF THE INVENTION

1. Field of the Invention

This invention relates generally to the transportation, handling and storage of hazardous wastes and other hazardous materials. More specifically, the present invention is concerned with a trailer which is adapted for transporting a containment unit for handling, distribution, storing and transporting hazardous materials.

2. Description of the Prior Art

The handling, storage and transport of hazardous materials, and particularly hazardous waste has become a problem of major proportions. Increased emphasis is being placed on the importance of assuring that solvents, lubricants, paint related products, and the like are stored and transported with adequate safeguards. Increasingly, it is being recognized that even small spills and relatively minor leakages of the growing number of substances that are being referred to by the term "hazardous material" can detrimentally affect persons, property, plants, animals, ground water and other aspects of ecology and the environment. Moreover, in view of increasing concern about the lasting nature of the adverse effects that can result from spills and unchecked leakage of hazardous materials, the issue of transportation, storage and distribution of hazardous materials is receiving increasing attention by law-makers, by government regulatory agencies, and by those who have been elected to govern and to enforce the laws and regulations relating to hazardous materials.

In the past, the standard form of container for the handling, storage and transportation of hazardous materials has been the 55 gallon steel drum. In transportation of hazardous materials using 55 gallon steel drums on the highways, especially at high speeds, the drums are easily ruptured if an accident occurs. A high impact against a gang of the drums in a truck accident at, for example, fifty five miles per hour, can cause a sort of domino effect wherein sufficient impact is transferred to a great number of the drums to rupture the drums. This is due to the basic cylindrical shape of the drum as well as its relatively thin walled construction.

During transportation of the drums, for example, from the site where the hazardous materials are being used to a permanent storage facility another hazard may occur when full drums are stacked which they frequently are because their shape clearly lends itself to stacking. In many instances the drums are stacked eight or nine tiers high. These drums often leak, with the leaking chemicals flowing down to mix with other chemicals below. In this situation, even if the individual chemicals are not in themselves particularly hazardous, an unknown and hazardous combination may result.

For these and other reasons, there remains a very genuine and real need for a well designed, heavy duty containment facility and a further need for an apparatus to transport the containment facility that appropriately will address today's increasing concern for the way in which hazardous materials are handled, transported and stored.

U.S. patent application, Ser. No. 08/342,451, filed Nov. 14, 1994, to Norman S. Van Valkenburgh et al addresses the first of these needs by providing a modular containment structure which allows for the safe transportation, storing and handling of containers of hazardous materials.

However, there is still a need for a trailer adapted to support and thereby allow for the safe transportation of the modular containment structure of U.S. patent application, Ser. No. 08/342,451 over the highways at speeds up to approximately fifty five miles per hour.

SUMMARY OF THE INVENTION

The structure constituting the present invention addresses the foregoing and other needs relating to the transportation of hazardous materials stored in a containment structure over the highways by providing a trailer adapted to support an environmentally safe modular storage unit. In addition, the trailer of the present invention will provide a good service life and under circumstances of reasonable use, will allow for the movement of environmentally safe modular storage units from site to site over the years as may be appropriate to address a series of different servicing needs.

The structure of the present invention comprises a trailer having a rectangular shaped frame and a hitch assembly extending longitudinally forward from the front end of the rectangular shaped frame. The hitch assembly is coupled to a tow truck or other suitable vehicle to allow the trailer and the modular storage unit to be towed from a hazardous material site to a collection or storage site.

The trailer is a tandem axle trailer which can be equipped with electrical brakes or hydraulic surge brakes as well as an emergency brake system and a lighting system. The underframe of the trailer includes a tandem axle wheel system which has four wheels and an oil lubricated hub and drums.

A pair of leveling stanchions attached to the rear of the trailer and a jack attached to the hitch assembly of the trailer are provided to level, stabilize and balance the trailer and modular storage unit on driveways, inclined pavements, floors and other surfaces at a collection site when the modular storage unit is being used to gather, store and inventory hazardous materials or at disposal a site when the hazardous materials are being removed from the modular storage unit.

The rectangular shaped frame of the trailer also has positioned at each of its corners a fastmount with the fastmounts of the trailer being adapted to secure the modular storage unit to the trailer while the trailer is being towed over the highway or when the modular storage unit is being utilized at a collection or storage site.

The novel features and advantages of the present invention and the manner of realizing will then become more apparent and the invention will be best understood from a study of the following description and the appended claims, with reference to the attached drawings.

Figure 1:
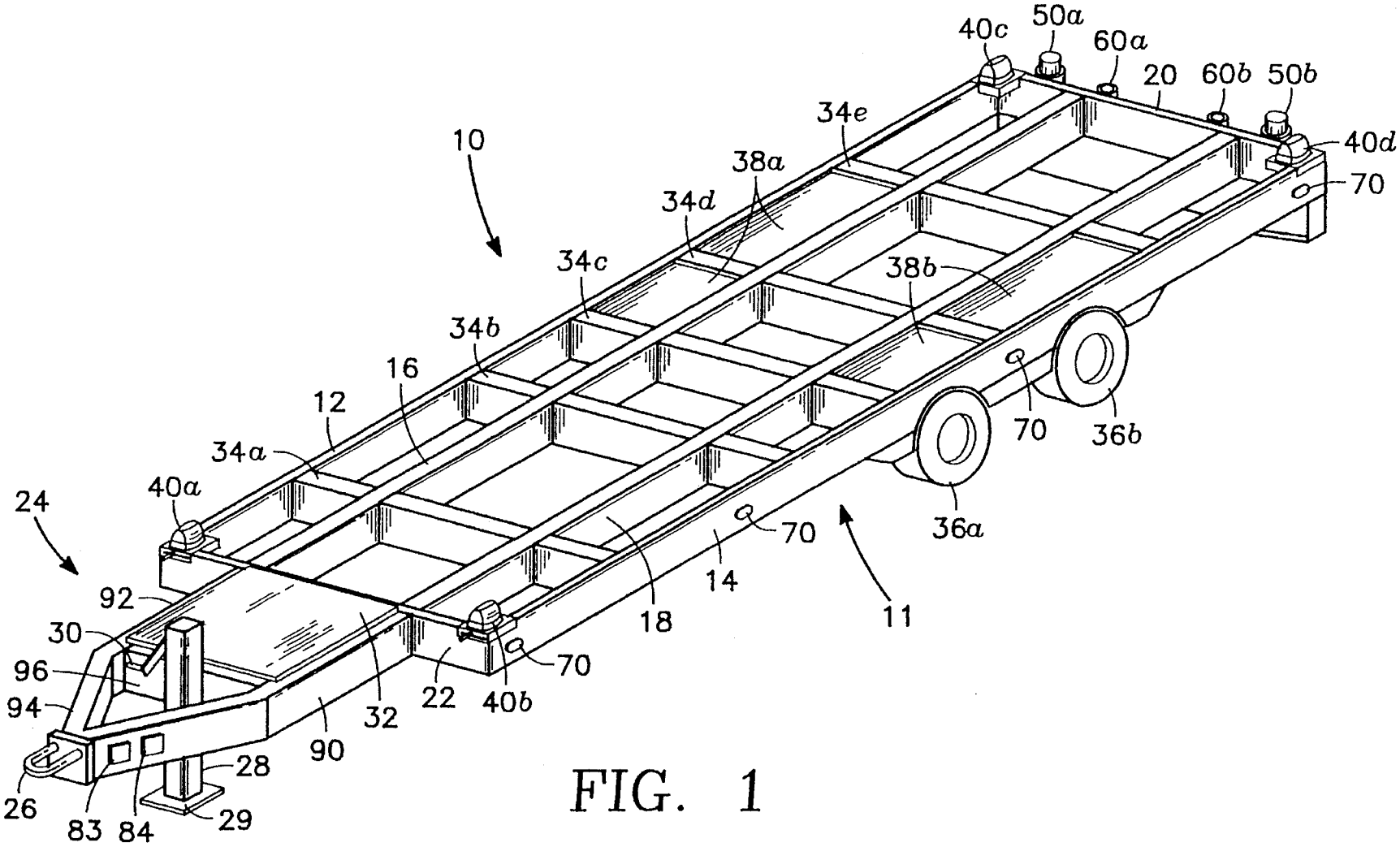
FIG. 1 is a perspective view of the trailer for transporting a environmentally safe modular storage unit which constitutes a preferred embodiment of the present invention.
Figure 7:
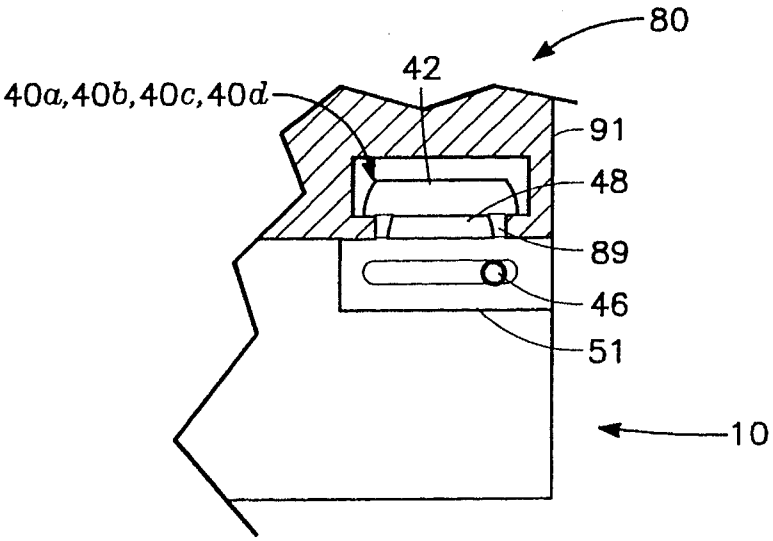
Figure 6:
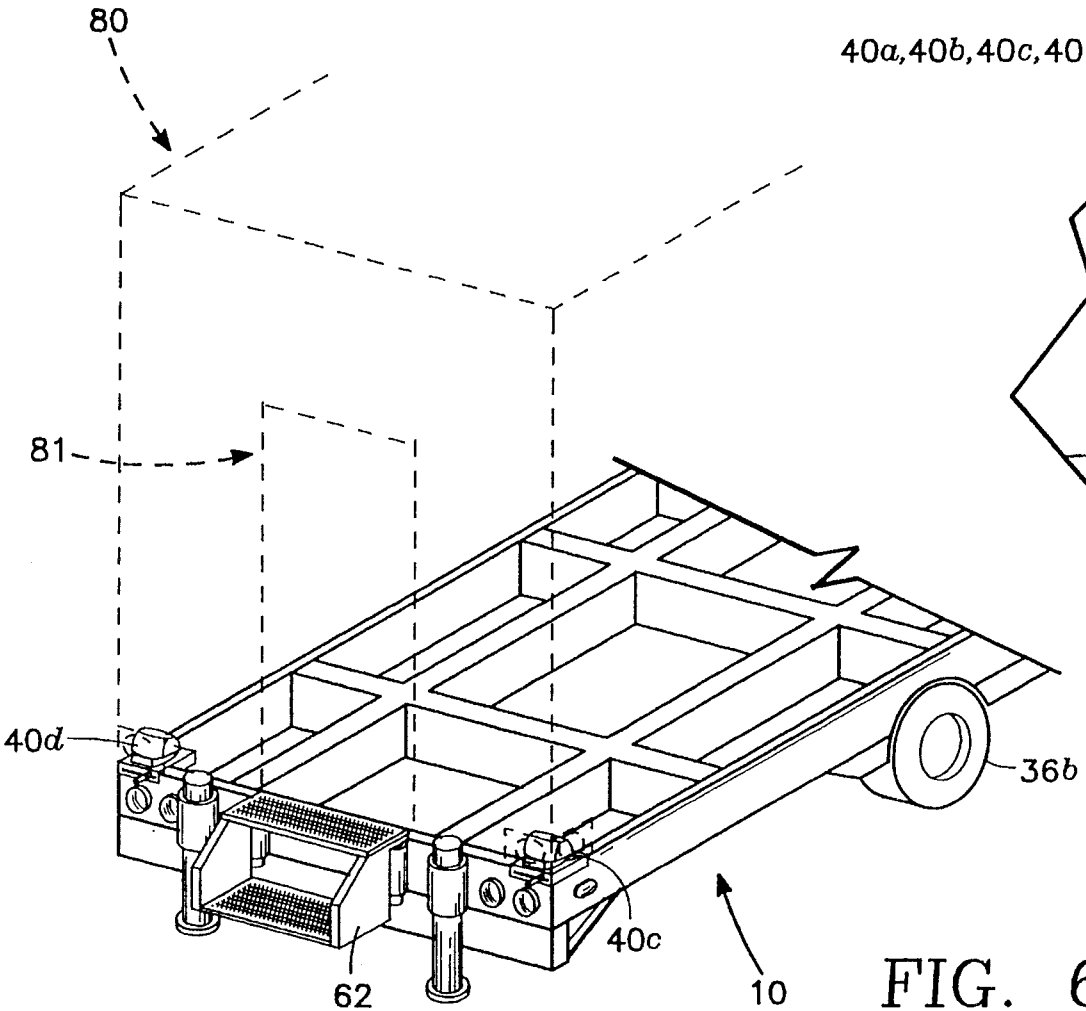

FIGS. *5a* and *5b* illustrates detailed views of one of the fast mounts which are used to mount a modular storage unit on the trailer of FIG. 1;

FIG. 6 is a partial rear view of the trailer having a modular storage unit mounted thereon to allow for transportation of the modular storage unit from site to site; and FIG. 7 is a sectional of one of the fast mounts of the trailer shown securing a corner of the modular storage unit to the trailer.

DETAILED DESCRIPTION OF THE PREFERRED EMBODIMENT

Referring to FIG. 1, there is shown a trailer that represents the best mode of carrying out the preferred practice of the present invention and is designated generally by the reference numeral 10. Trailer 10 has the general shape of a rectangle and is used to transport an environmentally safe modular storage unit 80 (illustrated in phantom in FIG. 6) over the highways at speeds approaching about fifty five miles per hour. The particular modular storage unit 80 which the trailer of the present invention is designed to transport over the highways is the modular storage unit disclosed in U.S. patent application, Ser. No. 08/342,451.

Figure 2:
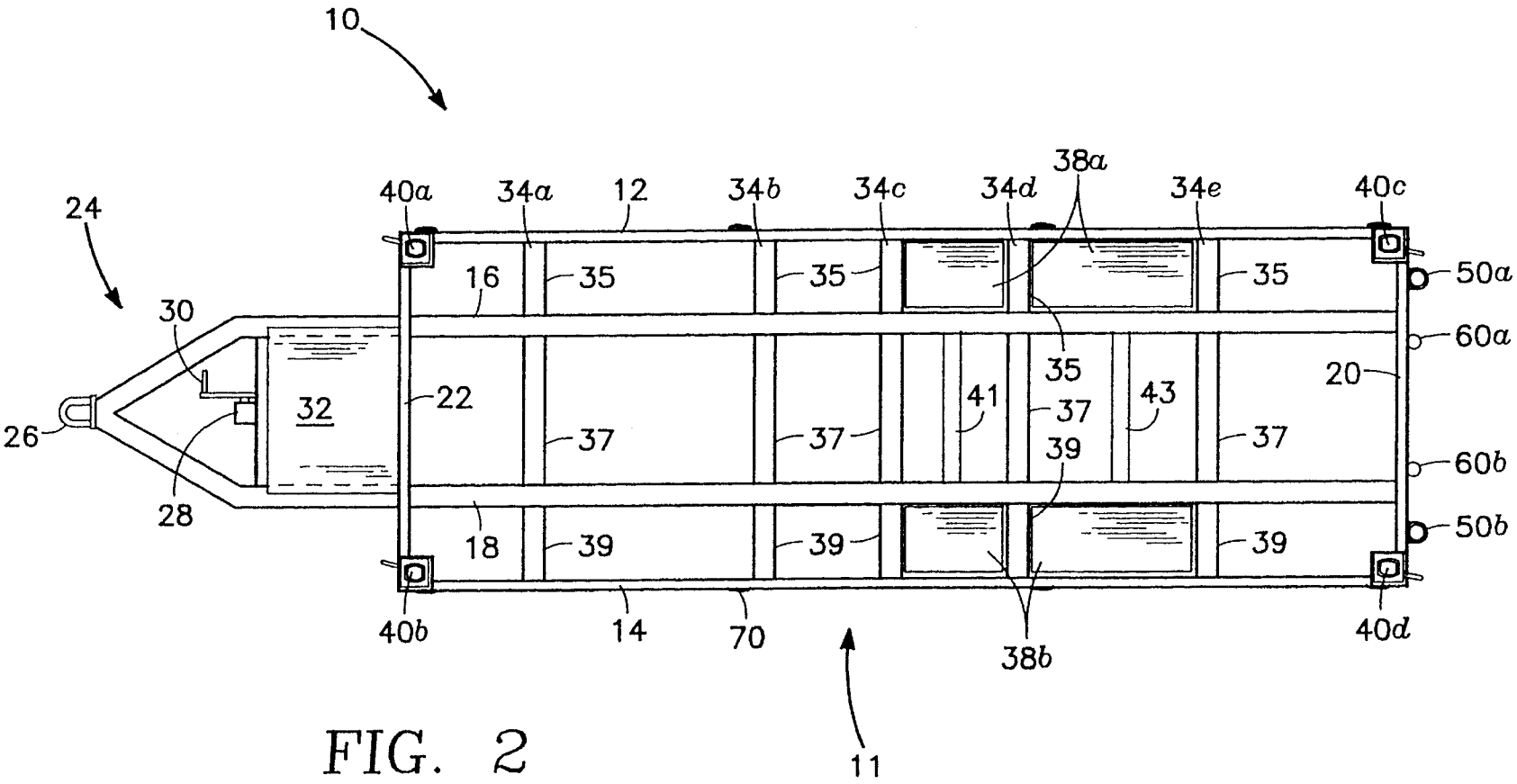
FIG. 2 is a top view of the trailer of FIG. 1.

Referring to FIGS. 1 and 2, there is shown the generally rectangular shaped framework or support structure of trailer 10 which is designated by the reference numeral 11. Attached to and extending longitudinally forward from front end of the rectangular shaped framework 11 of trailer 10 is a hitch assembly 24. Hitch assembly 24 includes a generally U shaped tow coupler 26 which allows a tow truck or other vehicle equipped with a mating tow coupling member (not illustrated) to be connected to trailer 10. This, in turn, allows for the movement of environmentally safe modular storage unit 80 (FIG. 6) from, for example, a hazardous materials site to a collection or storage site for hazardous materials.

The underframe of trailer 10 includes a set of four wheels positioned toward the rear portion of trailer 10. FIG. 1 illustrates two of the four wheels 36*a* and 36*b* which are located on the right side of the underframe of trailer 10. In a like manner, FIG. 6 illustrates one wheel 36*b* of the two wheels which are located on the left side of the underframe of trailer 10. It should be understood that the four wheels of trailer 10 are positioned toward the rear portion of trailer 10 to balance trailer 10 since the containers containing hazardous materials are generally stored in the rear portion of environmentally safe modular storage unit 80.

The pair of wheels 36*a* and 36*b* located on the right side of trailer 10 is provided with a wheel cover 38*b*, while the pair of wheels located on the left side of trailer 10 is provided with wheel cover 38*a* to protect the underside of modular storage unit 80 from rocks and other debris generally found on highways.

The wheels 36*a* and 36*b* of trailer 10 have tandem axles 41 and 43 (as shown in FIG. 2) and can have an oil lubricated hub and drums. The braking system for trailer 10 may be an electrical braking system having electric brakes and a brake connector 83 which allows the electrical braking system of trailer 10 to be connected to the braking system of the vehicle towing trailer 10. Alternatively, trailer 10 can be equipped with hydraulic surge brakes. In addition, it may be desirable to equip trailer 10 with a brake-away emergency system, emergency brakes or break away chains.

Referring again to FIGS. 1 and 2, rectangular shaped framework or support structure 11 of trailer 10 includes a right side tubular support member 14 which runs the length of the right side of support structure 11, a left side tubular support member 12 which runs the length of the left of support structure 11, a front end tubular support member 22 which runs the width the front of support structure 11 and a rear end tubular support member 20 which runs the width of the rear of support structure 11. Each end of one the support members 12, 14, 20 or 22 is joined to an abutting end of another of the support members 12, 14, 20 or 22 by means of welds (not illustrated).

Support structure 11 of trailer 10 includes a pair of internal tubular support members 16 and 18 which run the length of support structure 11 and are joined at their ends to members 20 and 22 by means of welds (not illustrated). Support structure 11 of trailer 10 also includes a plurality of cross braces 34*a*, 34*b*, 34*c*, 34*d* and 34*e* which are placed perpendicular to support members 16 and 18.

As shown in FIG. 2, each cross brace 34*a*, 34*b*, 34*c*, 34*d* and 34*e* comprises a left side tubular support member 35, a centrally located tubular support member 37 and a right side tubular members 39. The ends of support members 35, 37 and 39 of each cross brace 34*a*, 34*b*, 34*c*, 34*d* and 34*e* are joined to their associated support members 12, 14, 16 and 18 by means of welds (not illustrated).

At this time it should be noted that support members 12, 14, 16 and 18 are fabricated from structural tubular steel which is coated with non-corrosive and chemical resistant paint. In a like manner, the support members 35, 37 and 39 of cross braces 34*a*, 34*b*, 34*c*, 34*d* and 34*e* are fabricated from structural tubular steel which is coated with non-corrosive and chemical resistant paint. Twelve gauge tubular steel may be used to fabricate each of the support members of the rectangular shaped framework 11 of trailer 10.

Hitch assembly 24 of trailer 10 comprises a pair of tubular support members 90 and 92 which extend longitudinally forward from the front end tubular support member 22 of the rectangular shaped framework 11 and are joined to support member 22 by means of welds (not illustrated). Hitch assembly 24 has a V-shaped tubular support member 94 which is joined to members 90 and 92 by means of welds (not illustrated). Hitch assembly 24 also includes a cross brace/tubular support member 96 which is positioned between support members 90 and 92 and joined thereto by means of welds (not illustrated). Each of the tubular support members 90, 92, 94 and 96 of hitch assembly 24 is fabricated from structural tubular steel which is coated with non-corrosive and chemical resistant paint.

There is attached to the top of hitch assembly 24 a rectangular shaped plate 32 which is supported by members 90, 92 and 96. Plate 32 of hitch assembly 24 allows a portable electrical generator (not illustrated) to be mounted on the top of plate 32. The portable electrical generator, in turn, provides electrical power to environmentally safe modular storage unit 80 when unit 80 is being utilized in an environment where there is not a convenient source of electricity.

Figure 4:
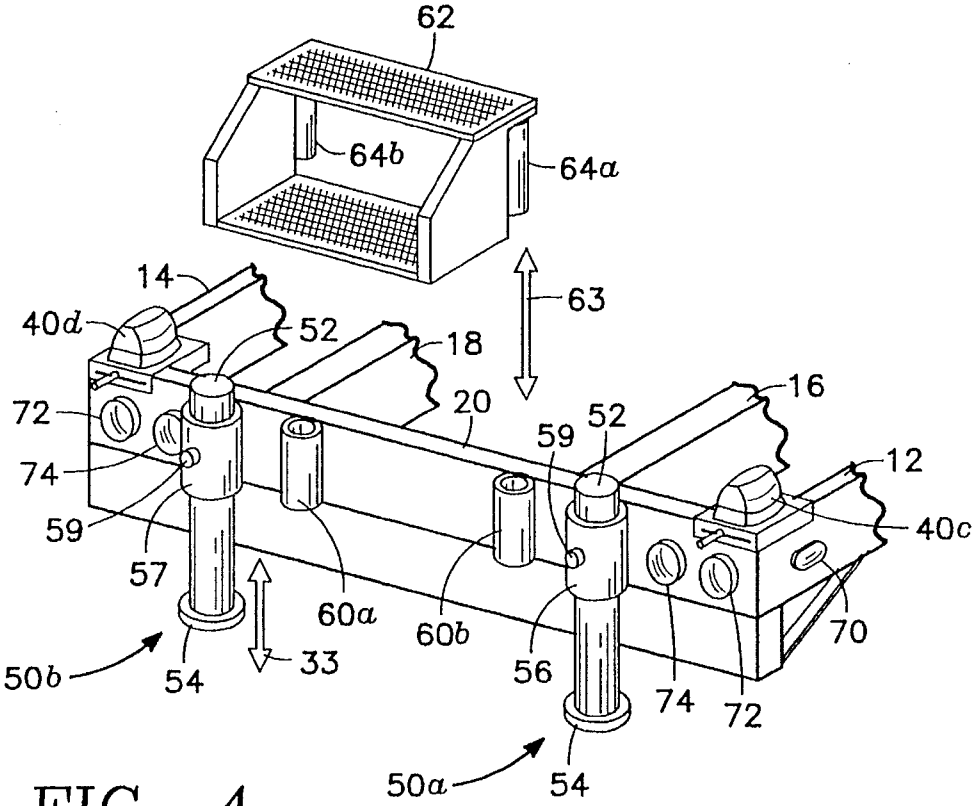
FIG. 4 is a partial rear end view of the trailer of FIG. 1.

Referring to FIGS. 1 and 4, hitch assembly 24 also has an electrical connector 84 which allows the electrical system of trailer 10 to be connected to the electrical system of the vehicle towing trailer 10. For example, the running lights 72 and the backup lights 74 of trailer 10 (FIG. 4) are connected to the electrical system of a vehicle towing trailer 10 by electrical connector 84 (FIG. 1).

It should also be noted at this time that there is attached to left side tubular support member 12 and right side tubular support member 14 a plurality of reflectors 70 which reflect incoming light to indicate the presence of trailer 10 and modular storage unit 80 in, for example, a night time environment or at dusk.

Figure 3:
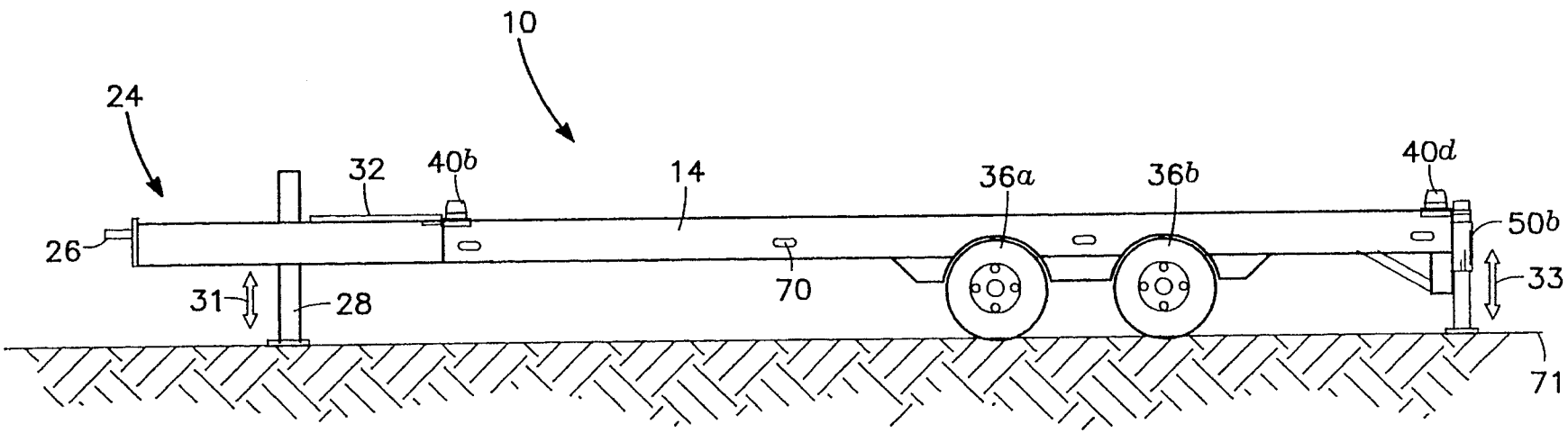
FIG. 3 is a side view of the trailer of FIG. 1.

Referring to FIGS. 1, 3 and 4, there is also provided a means for leveling, stabilizing and balancing trailer 10 on driveways, inclined pavements, floors and other surfaces at a collection site when modular storage unit 80 is being used to gather, store and inventory hazardous materials or at disposal site when the hazardous materials are being removed from modular storage unit 80. A jack 28 which includes an upper hand crank 30 and a base plate 29 attaches to cross brace 96. A user of trailer 10 and modular storage unit 80 may then use the hand crank 30 of jack 28 to raise or lower trailer 10 (as is best indicated by arrow 31) and thereby level and stabilize trailer 10 on surface 71.

Referring to FIG. 4, there is also attached to the rear of trailer 10 a pair of collars 56 and 57 adapted to respectively receive a pair of leveling stanchions 50*a* and 50*b*. Each leveling stanchion 50*a* and 50*b* includes a base assembly 54 and a cylindrical shaped member 52 which is attached to and extends upward from base 54. Pins 59 which are inserted through apertures (not illustrated) within member 52 of leveling stanchions 50*a* and 50*b* are used to fixedly secure collar 56 to leveling stanchion 50*a* and collar 57 to leveling stanchion 50*b*. When leveling stanchions 50*a* and 50*b* are fixedly secured to collars 56 and 57 of trailer 10, the user of trailer 10 may balance and stabilize trailer 10 by using jack 28 to either raise or lower trailer 10 until trailer 10 is level. It should be understood that member 52 of leveling stanchions 50*a* and 50*b* includes multiple apertures to allow trailer to be either raised or lowered (as indicated by arrow 33) until trailer 10 is positioned at the desired height above surface 71.

In the alternative, jack 28 could be an electric jack which could be used to level and stabilize trailer 10.

Referring to FIGS. 1, 4 and 5 trailer 10 also has attached to its rear end tubular support member 20 a pair of collars 60*a* and 60*b*. Collars 60*a* and 60*b* are adapted to receive the downwardly extending cylindrical shaped support members 64*a* and 64*b* of a set of steps 62 (as indicated by arrow 63) after trailer 10 is leveled and stabilized. Collars 60*a* and 60*b* then secure steps 62 to trailer 10 allowing the user of environmentally safe modular storage unit 80 to enter and exit storage unit 80 through door 81.

Referring to FIGS. 1, 4, 5*a*, 5*b* and 7, each of the four corners of have a fastmount 40*a*, 40*b*, 40*c* or 40*d* which is mounted on a top portion of framework 11 and secured to framework 11 by means of welds (not illustrated). Each fastmount 40*a*, 40*b*, 40*c* or 40*d*, in turn, has a base 44 which is recessed within an indent 51 at each corner of rectangular shaped framework 11. Base 44 has extending outwardly therefrom a locking arm 46 which is coupled to and rotates a locking member 42.

Figure 5A:
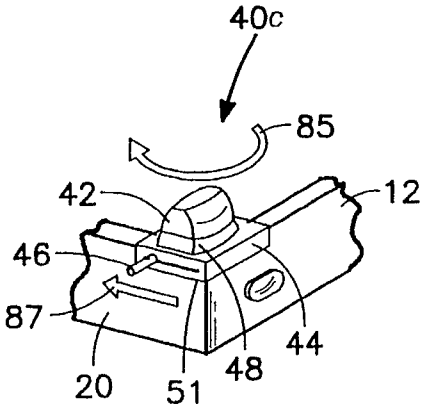
Figure 5B:
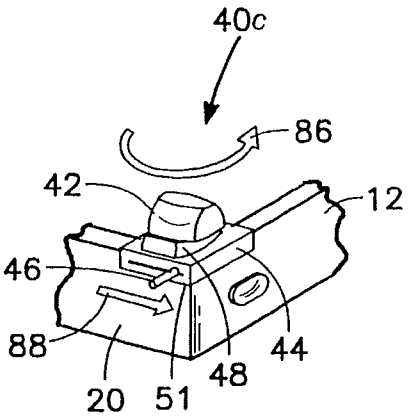

As shown in FIG. 5*a*, when the user moves/pushes locking arm 46 of fast mount 40*c* in the direction indicated by arrow 87, locking member 42 rotates in the clockwise direction to an unlocked position as indicated by arrow 85. Similarly as shown in FIG. 5*b*, when it is desired to rotate locking member 42 of fast mount 40*c* in a counterclockwise direction 86 to a locked position the user may move/push locking arm 46 in the direction indicated by arrow 88. Each fastmount 40*a*, 40*b*, 40*c* and 40*d* also has a support block 48 upon which locking member 42 is rotatably mounted.

After locking arm 46 is moved in the direction indicated by arrow 88 (FIG. 5B), locking member 42 secures trailer 10 to modular storage unit 80 by engaging an inside portion of the frame 91 of unit 80 in the manner illustrated by FIG. 7. It should be noted that the support block 48 of each fastmount 40*a*, 40*b*, 40*c* and 40*d* is configured for snug fit within the aperture 89 located at each bottom corner of modular storage unit 80 as is best illustrated by FIG. 7. This, in turn, prevents forward, backward and sideways movement of modular storage unit 80 when modular storage unit 80 is being towed by vehicle form one site to another site over the highways.

At this time it should be noted that trailer 10 has a payload capacity of about 26,900 pounds when traveling at a speed of fifty five miles per hour over the highway. In addition, it should be noted that the over all length of trailer 10 is 384 inches and the width of trailer 10 is 102 inches.

From the foregoing, it may readily be seen that the present invention comprises a new, unique and exceedingly useful trailer for transporting a modular storage unit containing hazardous materials which constitutes a considerable improvement over the known prior art. Obviously, many modifications and variations of the present invention are possible in light of the above teachings. It is therefore to be understood that within the scope of the appended claims that the invention may practiced otherwise than as specifically described.

What is claimed is:

1. A mobile trailer for transporting an environmentally safe modular storage unit over a highway, said environmentally safe modular storage unit have a frame, said mobile trailer comprising:

(a) a rectangular shaped frame work having four corners, said rectangular shaped framework including:

(i) a front end tubular support member, a rear end tubular support member and a pair of side tubular support members that are arranged end to end to define said rectangular shaped framework that has one end of each of the side tubular support members attached to a separate one of the opposed ends of the front end tubular support member and that has the other end of each of the side tubular support members attached to a separate one of the opposed ends of the rear end tubular support member;

(ii) first, second, third and fourth fastmounts, one of said first, second, third and fourth fastmounts being mounted on each of the four corners of said rectangular shaped frame work, each of said first, second, third and fourth fastmounts including:

A) a base recessed within an indent at one of the four corners of said rectangular shaped framework;

B) a support block fixedly attached to top portion of said base, said support block being adapted to fit snugly within an aperture located at each bottom corner of said environmentally safe modular storage unit;

C) a locking arm extending outwardly from said base; and

D) a locking member rotatably mounted on said support block, said locking member engaging an inside portion of the frame of said environmentally safe modular storage unit when said locking member is in a locked position, said locking arm being adapted to rotate said locking member to said locked position when said locking arm is a moved in one direction and said locking member being adapted to rotate said locking member to an unlocked position when said locking arm is a moved in an opposite direction, said first, second, third and fourth fastmounts securing said environmentally safe modular storage unit to said mobile trailer when the locking member of each of said first, second, third and fourth fastmounts is in the lock position;

(b) a tandem axis wheel assembly mounted on an underside of the rectangular shaped framework of said mobile trailer, said tandem axis wheel assembly having four wheels; and (c) a hitch assembly attached to and extending longitudinally forward from the front end tubular support member of the rectangular shaped frame.

2. The mobile trailer of claim 1 wherein said front end tubular support member, said rear end tubular support member and said pair of side tubular support members are fabricated from tubular steel.

3. The mobile trailer of claim 1 further comprising a pair of running lights positioned on the rear end tubular support member of said rectangular shaped framework.

4. The mobile trailer of claim 1 further comprising a pair of backup lights positioned on the rear end tubular support member of said rectangular shaped framework.

5. A mobile trailer for transporting an environmentally safe modular storage unit over a highway, said environmentally safe modular storage unit have a frame, said mobile trailer comprising:

(a) a rectangular shaped framework having four corners, said rectangular shaped framework including:

(i) a front end tubular support member, a rear end tubular support member and a pair of side tubular support members that are arranged end to end to define said rectangular shaped framework that has one end of each of the side tubular support members attached to a separate one of the opposed ends of the front end tubular support member and that has the other end of each of the side tubular support members attached to a separate one of the opposed ends of the rear end tubular support member;

(ii) first, second, third and fourth fastmounts, one of said first, second, third and fourth fastmounts being mounted on each of the four corners of said rectangular shaped framework, each of said first, second, third and fourth fastmounts including:

A) a base recessed within an indent at one of the four corners of said rectangular shaped framework;

B) a support block fixedly attached to top portion of said base, said support block being adapted to fit snugly within an aperture located at each bottom corner of said environmentally safe modular storage unit;

C) a locking arm extending outwardly from said base; and

D) a locking member rotatably mounted on said support block, said locking member engaging an inside portion of the frame of said environmentally safe modular storage unit when said locking member is in a locked position, said locking arm being adapted to rotate said locking member to said locked position when said locking arm is a moved in one direction and said locking member being adapted to rotate said locking member to an unlocked position when said locking arm is a moved in an opposite direction, said first, second, third and fourth fastmounts securing said environmentally safe modular storage unit to said mobile trailer when the locking member of each of said first, second, third and fourth fastmounts is in the locked position;

(b) a tandem axis wheel assembly mounted on an underside of the rectangular shaped framework of said mobile trailer, said tandem axis wheel assembly having four wheels; and (c) a hitch assembly attached to and extending longitudinally forward from the front end tubular support member of the rectangular shaped frame, said hitch assembly including:

(i) a pair of hitch tubular support members extending longitudinally forward from the front end tubular support member of said rectangular shaped framework, said pair of hitch tubular support members having one end attached to the front end tubular support member of said rectangular shaped framework;

(ii) a V-shaped tubular support member attached to the opposed ends of said pair of hitch tubular support members of said hitch assembly;

(iii) a cross brace tubular support member positioned between support said pair of hitch tubular support members of said hitch assembly; and (iv) a U shaped tow coupler attached to said V-shaped tubular support member.

6. The mobile trailer of claim 5 further comprising a pair of running lights positioned on the rear end tubular support member of said rectangular shaped framework.

7. The mobile trailer of claim 5 further comprising a pair of backup lights positioned on the rear end tubular support member of said rectangular shaped framework.

8. The mobile trailer of claim 5 further comprising a rectangular shaped plate mounted on a top portion of said hitch assembly.

9. The mobile trailer of claim 5 further comprising portable steps coupled to the rear end tubular support member of said rectangular shaped framework, said portable steps being removable from the rear end tubular support member of said rectangular shaped framework.

10. The mobile trailer of claim 5 further comprising jack removably coupled to the cross brace tubular support member of said hitch assembly and a pair of leveling stanchions removably coupled to the rear end tubular support member of said rectangular shaped framework, said jack and said leveling stanchions being adapted to balance and stabilize said mobile trailer when said mobile trailer is in a parked position.

11. The mobile trailer of claim 5 wherein said front end tubular support member, said rear end tubular support member and said pair of side tubular support members are fabricated from tubular steel.

12. A mobile trailer for transporting an environmentally safe modular storage unit over a highway, said environmentally safe modular storage unit have a frame, said mobile trailer comprising:

(a) a rectangular shaped framework having four corners, said rectangular shaped framework including:

(i) a front end tubular support member, a rear end tubular support member and a pair of side tubular support members that are arranged end to end to define said rectangular shaped framework that has one end of each of the side tubular support members attached to a separate one of the opposed ends of the front end tubular support member and that has the other end of each of the side tubular support members attached to a separate one of the opposed ends of the rear end tubular support member;

(ii) first, second, third and fourth fastmounts, one of said first, second, third and fourth fastmounts being mounted on each of the four corners of said rectangular shaped framework, each of said first, second, third and fourth fastmounts including:

A) a base recessed within an indent at one of the four corners of said rectangular shaped framework;

B) a support block fixedly attached to top portion of said base, said support block being adapted to fit snugly within an aperture located at each bottom corner of said environmentally safe modular storage unit;

C) a locking arm extending outwardly from said base; and

D) a locking member rotatably mounted on said support block, said locking member engaging an inside portion of the frame of said environmentally safe modular storage unit when said locking member is in a locked position, said locking arm being adapted to rotate said locking member to said locked position when said locking arm is a moved in one direction and said locking member being adapted to rotate said locking member to an unlocked position when said locking arm is a moved in an opposite direction, said first, second, third and fourth fastmounts securing said environmentally safe modular storage unit to said mobile trailer when the locking member of each of said first, second, third and fourth fastmounts is in the locked position;

(iii) a pair of internal tubular support members positioned parallel to said pair of side tubular support members within said rectangular shaped framework, each of said pair of internal tubular support members having one end attached to the front end tubular support member of said rectangular shaped framework and an opposed end attached to the rear end tubular support member of said rectangular shaped framework; and (iv) five cross brace tubular support members positioned parallel to said front and rear end tubular support members within said rectangular shaped framework, each of said five cross brace tubular support members having one end attached to one of the side tubular support members of said rectangular shaped framework and an opposed end attached to the other of the side tubular support member of said rectangular shaped framework;

(b) a tandem axis wheel assembly mounted on an underside of the rectangular shaped framework of said mobile trailer, said tandem axis wheel assembly having four wheels, and (c) a hitch assembly attached to and extending longitudinally forward from the front end tubular support member of the rectangular shaped frame, said hitch assembly including:

(i) a pair of hitch tubular support members extending longitudinally forward from the front end tubular support member of said rectangular shaped framework, said pair of hitch tubular support members having one end attached to the front end tubular support member of said rectangular shaped framework;

(ii) a V-shaped tubular support member attached to the opposed ends of said pair of hitch tubular support members of said hitch assembly;

(iii) a sixth cross brace tubular support member positioned between support said pair of hitch tubular support members of said hitch assembly; and (iv) a U shaped tow coupler attached to said V-shaped tubular support member.

13. The mobile trailer of claim 12 further comprising a pair of running lights positioned on the rear end tubular support member of said rectangular shaped framework.

14. The mobile trailer of claim 12 further comprising a pair of backup lights positioned on the rear end tubular support member of said rectangular shaped framework.

15. The mobile trailer of claim 12 further comprising a rectangular shaped plate mounted on a top portion of said hitch assembly.

16. The mobile trailer of claim 12 further comprising portable steps coupled to the rear end tubular support member of said rectangular shaped framework, said portable steps being removable from the rear end tubular support member of said rectangular shaped framework.

17. The mobile trailer of claim 12 further comprising jack removably coupled to the cross brace tubular support member of said hitch assembly and a pair of leveling stanchions removably coupled to the rear end tubular support member of said rectangular shaped framework, said jack and said leveling stanchions being adapted to balance and stabilize said mobile trailer when said mobile trailer is in a parked position.

18. The mobile trailer of claim 12 wherein said front end tubular support member, said rear end tubular support member and said pair of side tubular support members are fabricated from tubular steel.

* * * * *